United States Patent [19]

Gerard

[11] Patent Number: 4,751,437
[45] Date of Patent: Jun. 14, 1988

[54] WIDE BANDWIDTH LINEAR MOTOR SYSTEM

[75] Inventor: William A. Gerard, Andover, Mass.

[73] Assignee: Varian Associates, Inc., Palo Alto, Calif.

[21] Appl. No.: 844,068

[22] Filed: Mar. 26, 1986

[51] Int. Cl.[4] .............................................. H02K 41/00
[52] U.S. Cl. .................................... 318/135; 381/158; 310/13
[58] Field of Search ............................. 310/13, 27, 12; 318/135, 121; 381/158, 194

[56] References Cited

U.S. PATENT DOCUMENTS

| | | | |
|---|---|---|---|
| 3,194,992 | 7/1965 | Brown | 310/27 |
| 3,439,198 | 4/1969 | Lee | 310/13 |
| 3,487,241 | 12/1969 | Carter | 310/13 |
| 3,751,693 | 8/1973 | Gabor | 310/13 |
| 4,144,466 | 3/1979 | Hatch | 310/13 |

Primary Examiner—Donovan F. Duggan
Attorney, Agent, or Firm—Stanley Z. Cole; Gerald M. Fisher; Peter J. Sgarbossa

[57] ABSTRACT

A wide bandwidth linear motor system suitable for high performance applications such as driving the tuning plunger of a magnetron oscillator. The linear motor includes a coil assembly with a structure which suppresses secondary resonances, thereby permitting the linear motor to be used in a wide bandwidth servo control loop. The coil assembly includes a cylindrical coil support, a bushing coaxial with the coil support for attachment to the linear motor shaft, a plurality of radial ribs connecting the coil support to the bushing and a coil having multiple turns wound circumferentially around the coil support. The coil support is subdivided by axial gaps into at least two separate coil support elements, each connected by a radial rib to the bushing. Resonance of the coil support and the coil is suppressed by the separate coil support elements and the lossy connection therebetween.

12 Claims, 3 Drawing Sheets

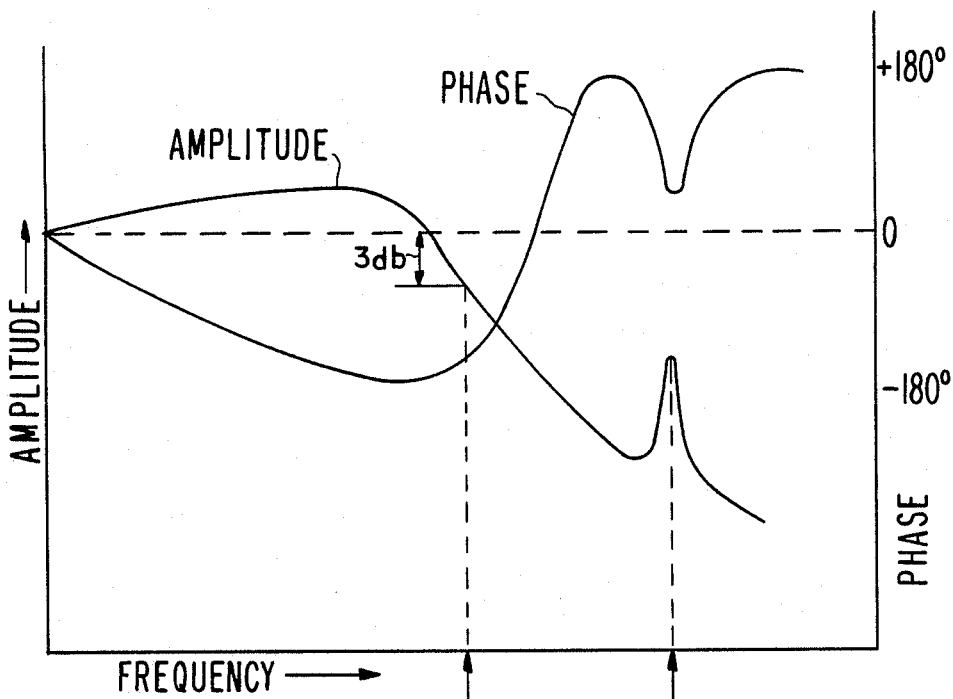
FIG.2A
PRIOR ART
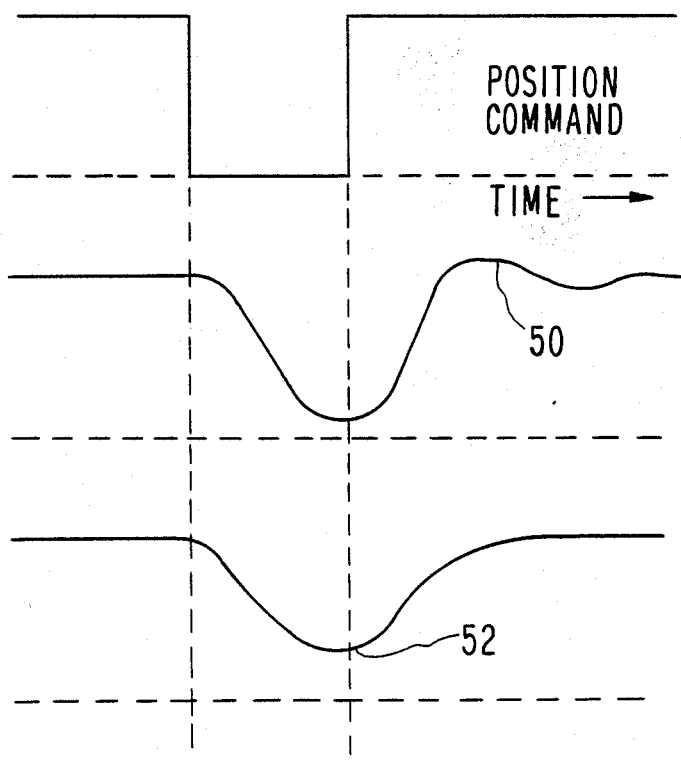
FIG.2B
PRIOR ART
FIG.2C
PRIOR ART
FIG.2D
PRIOR ART

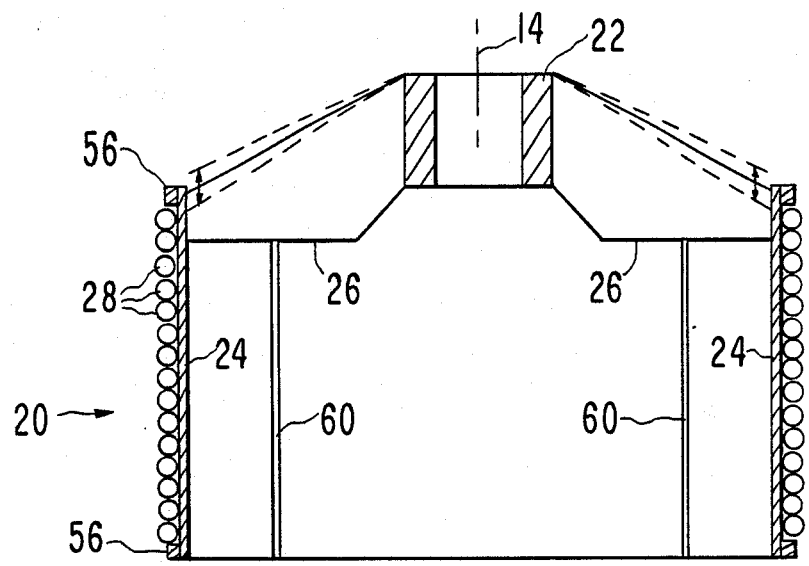
FIG.3A
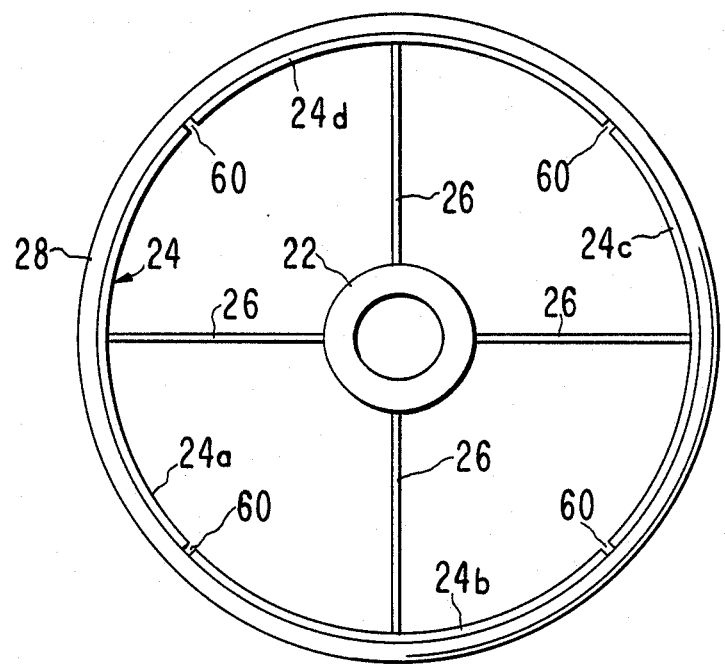
FIG.3B
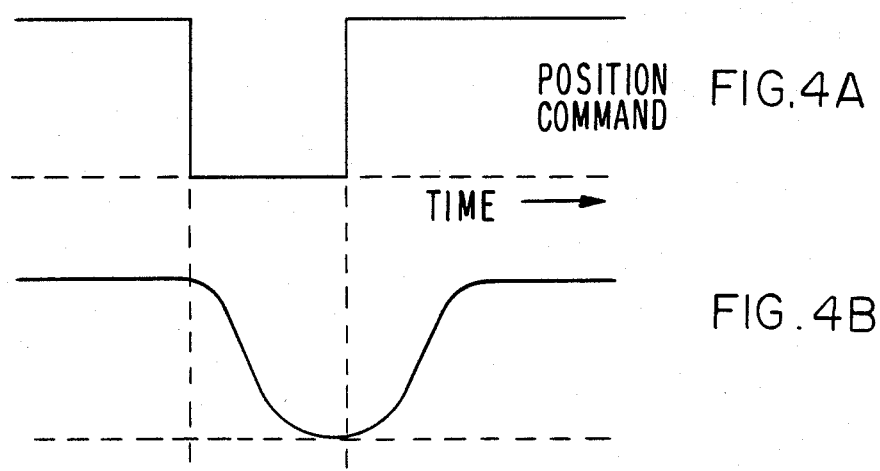
FIG.4A
FIG.4B

WIDE BANDWIDTH LINEAR MOTOR SYSTEM

FIELD OF THE INVENTION

This invention relates to wide bandwidth linear motor systems and, more particularly, to a linear motor having a coil support structure wherein secondary resonances are suppressed, thereby permitting wide bandwidth operation.

BACKGROUND OF THE INVENTION

Linear motors are widely used for a variety of applications. In one group of applications, high speed, or accurate waveform tracking, and accurate positioning are required from the linear motor. Stable operation without overshoot or oscillation is also a requirement. An example of such an application is a linear motor used to drive the tuning plunger in a high frequency, high power magnetron oscillator. The magnetron oscillator is commonly used in a radar transmitter, and the tuning plunger controls the transmitted frequency. The transmitted frequency may be varied in accordance with different frequency control waveforms, including rapid steps between frequencies and gradual frequency variations. In such an application, the speed, position accuracy and stability of the linear motor which drives the tuning plunger are of utmost importance.

Linear motors for such applications typically include a circumferential coil on a cylindrical support which is rigidly attached to a linearly movable shaft, and means for producing a radial magnetic field which intersects the conductors of the coil. When a current is applied to the coil, the magnetic field exerts an axial force on the coil, causing linear motion.

It is customary to place the linear motor in a servo loop to provide well-controlled operation. The position of the movable shaft is sensed by a position sensor and fed back for comparison with a desired position signal. An error signal produced by the comparison is supplied to an amplifier for energizing the coil to correct the position of the shaft. It is well-known that the bandwidth of a servo loop, which determines the rate at which the shaft position can be changed, depends on the loop gain. However, when servo loop has high closed loop gain, the tendency for instability and oscillation is increased. A second servo loop, where velocity is measured and applied to the amplifier as a negative or damping feedback, can be used to control oscillation.

A second limitation to the usable gain occurs in the structure of the motor. The motor force element is connected mechanically to a position sensor and a velocity sensor through a structure which exhibits resonant characteristics. Thus, sensors which normally return a negative feedback signal to the servo can return an amplified in-phase signal to the servo loop, thereby causing oscillation. The secondary resonance cannot be permitted to function since it is damaging to the motor structure and consumes large amounts of servo power. It is not necessary that the servo and force element be separated by the secondary resonance element as long as the secondary resonance can introduce a large signal into the sensor.

The simplest solution to the secondary resonance problem is to reduce the forward gain until the secondary oscillation ceases. This also reduces the effect of servo bandwidth and directly reduces servo performance. Another solution is to use an electronic notch filter in the feedback loop to suppress oscillations at the secondary resonance frequency. This solution is superior to the reduction of gain, but also tends to reduce bandwidth since the filter is likely to exhibit a broad continuation of gain over a wide bandwidth, causing a reduction in the desired operating range. Mechanical damping can also be used but adds mass which reduces servo performance.

It is a general object of the present invention to provide a novel wide bandwidth linear motor system.

It is another object of the present invention to provide a novel linear motor system wherein secondary resonances are suppressed.

It is a further object of the present invention to provide a novel wide bandwidth linear motor system wherein secondary resonances are suppressed without adversely affecting motor performance.

It is a further object of the present invention to provide a linear motor having a coil support which is subdivided into separate coil support elements for suppression of secondary resonances.

SUMMARY OF THE INVENTION

According to the present invention, these and other objects and advantages are achieved in an improved linear motor for driving a shaft connected to a load with linear motion along the shaft axis. The linear motor comprises a movable coil assembly, including a cylindrical coil support coaxial with the shaft, a bushing of smaller diameter than the coil support attached to the shaft, a plurality of radial ribs connecting the bushing to the coil support, and a coil comprising multiple turns of a conductor wound circumferentially around the coil support. The linear motor further includes means for producing a radial magnetic field intersecting the coil and means for supplying electrical current to the coil. The improvement to the linear motor of the present invention comprises the cylindrical coil support being subdivided into at least two separate coil support elements, each connected by at least one of the radial ribs to the bushing, whereby secondary resonance of the coil assembly is suppressed.

The coil support is preferably subdivided by a plurality of axial gaps into generally arc-shaped coil support elements. When the improved linear motor of the present invention is used in a servo loop, oscillation caused by secondary resonance of the coil assembly is suppressed and wide bandwidth operation is obtained.

BRIEF DESCRIPTION OF THE DRAWINGS

For a better understanding of the present invention together with other and further objects, advantages and capabilities thereof, reference may be had to the accompanying drawings which are incorporated herein by reference and in which:

FIGS. 2A–2D graphic representations of the performance of prior art systems which have secondary resonance;

FIGS. 3A and 3B illustrate the improved coil assembly in accordance with the present invention; and FIGS. 4A and 4B illustrate the performance of the linear motor system in accordance with the present invention.

DETAILED DESCRIPTION OF THE INVENTION

Figure 1:
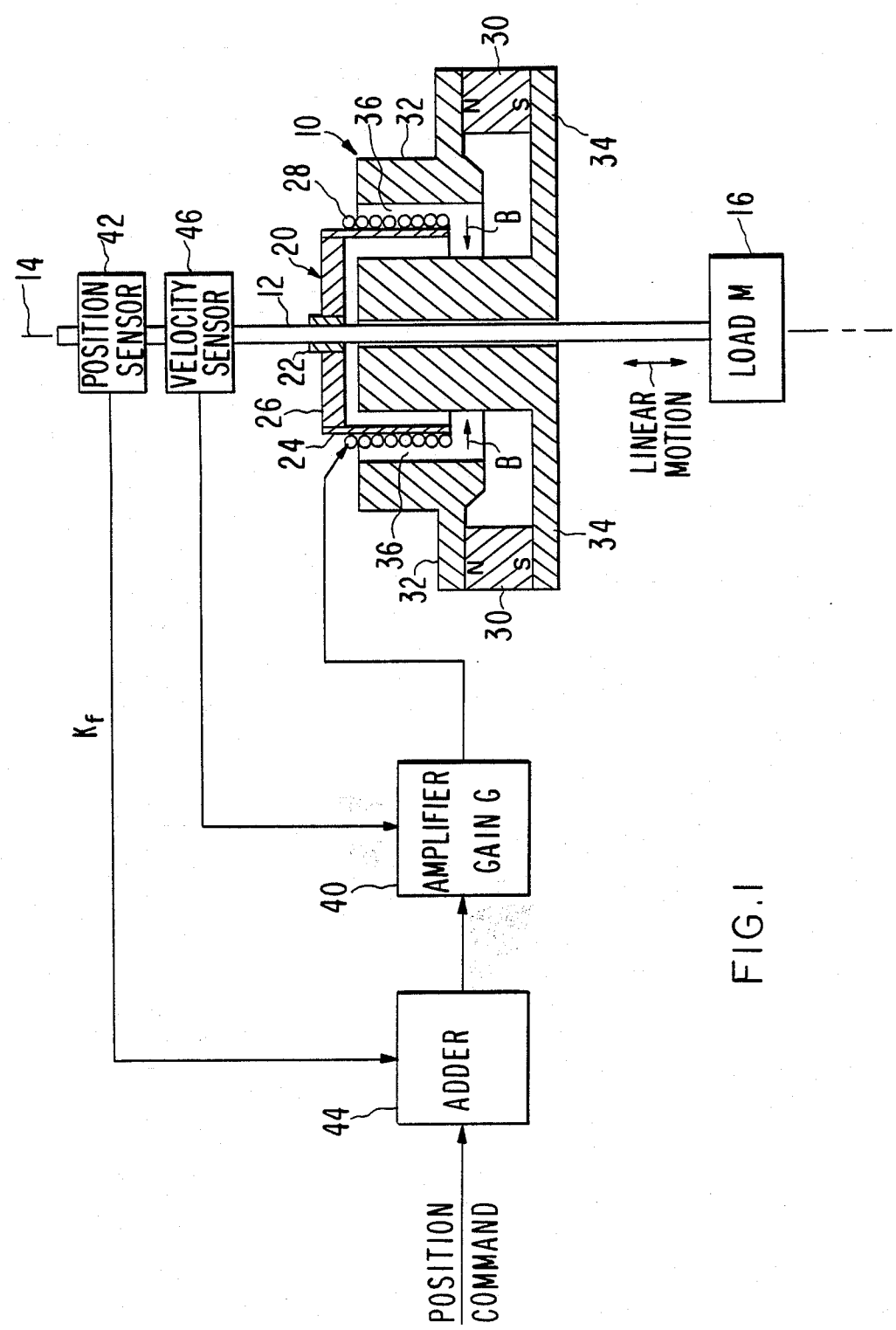
FIG. 1 illustrates a linear motor system including a linear motor in a servo loop.

A linear motor system is shown in FIG. 1. A linear motor 10 moves a drive shaft 12 with linear motion along a shaft axis 14. The shaft 12 is connected to a load 16 having a mass M. The linear motor 10 includes a coil assembly 20 rigidly attached to the shaft 12. The coil assembly 20 includes a bushing 22 attached to the shaft 12, a cylindrical coil support 24 coaxial with the shaft 12 and a plurality of radial ribs 26 extending from the smaller diameter bushing 22 to the larger diameter coil support 24. The radial ribs 26 position the coil support 24 relative to the shaft 12. A coil 28 consists of a conductor wound with multiple circumferential turns around the cylindrical coil support 24.

The linear motor 10 further includes means for producing a radial magnetic field B which intersects the coil 28 at right angles. The magnetic field B is produced by a magnet assembly including a magnet 30 and magnetic pole pieces 32, 34 connected to the magnet 30. The magnet 30 and the pole pieces 32, 34 shown in FIG. 1 are symmetrical figures of revolution about axis 14. The pole piece 32 has a cylindrical inner surface located outside the coil 28, while the pole piece 34 has a cylindrical outer surface located inside the coil support 24. The cylindrical inner surface of pole piece 32 and the cylindrical outer surface of pole piece 34 in combination define an annular gap 36 in which the magnetic field B subsists.

As a result of the relative orientations of the magnetic field B and the conductors of coil 28, a current through coil 28 produces a force on coil 28 along the axis 14. By controlling the current in the coil 28, linear movement of the shaft 12 and the load 16 are precisely controlled.

A linear motor of the type shown in FIG. 1 is commonly utilized in a servo loop to obtain precisely controlled operation. The elements of the servo loop are shown in block diagram form in FIG. 1. An amplifier 40 supplies current to the coil 28. A position sensor 42, such as a linear variable differential transformer attached to the shaft 12, senses the position of the shaft 12 and the load 16 and supplies a feedback signal representative of shaft position to one input of an adder circuit 44. The adder circuit 44 receives a position command signal of opposite phase from the feedback signal at another input. The position command signal is supplied from a system controller. The position command signal and feedback signal are added to produce a difference or error signal output which is supplied to the amplifier 40. Any difference between the desired position and the actual position results in the linear motor 10 being energized until the error signal becomes zero. The servo loop described above can be stabilized by the use of a velocity sensor 46 such as a linear variable transformer coupled to the shaft 12. Velocity sensor 46 produces a voltage representative of the shaft 12 velocity which is fed back to the amplifier 40 and causes a reduction in gain in relatively high velocity conditions.

In a position control servo loop of the type shown in FIG. 1, wide servo bandwidth is required to provide rapid movement and accurate waveform tracking. The servo bandwidth is defined as the one-half amplitude response of a sine wave of increasing frequency. For example, a servo loop having a 300 Hz bandwidth can position the load at a 300 Hz rate when a sine wave command signal is applied, but cannot provide a 300 Hz square wave response since the required higher frequency Fourier components are highly attenuated.

The servo bandwidth is determined by the usable loop gain and can be defined by the following equation $$f = \frac{1}{2\pi} \sqrt{\frac{K_s}{M}} \quad (1)$$

where
  f = servo bandwidth in Hz
  $K_s$ = servo constant in pounds per inch
  M = mass in pounds second$^2$ per inch The servo constant or loop gain, $K_s$, is defined as follows $$K_s = G K_m K_f \quad (2)$$

where
  G = gain of amplifier in amps per volt
  $K_m$ = motor constant in pounds per amp
  $K_f$ = feedback constant in volts per inch Increasing the loop gain, $K_s$, increases the servo bandwidth for a given load of mass M. However, the increase in loop gain $K_s$ is limited by the stability of the servo loop which will tend to oscillate. A second servo loop can be used to control the instability where velocity is measured by the sensor 46 and applied to the amplifier 40 as negative or damping feedback.

Another limitation to the usable gain occurs in the structure of the linear motor 10. The motor force element, coil assembly 20, is connected mechanically to position sensor 42 and to velocity sensor 46 through a structure which normally exhibits resonant characteristics. Thus, each sensor 42, 46, which should normally return a negative feedback signal to the servo loop, can return an amplified positive, or in-phase, feedback signal to the servo loop. The positive feedback signal will cause the loop to oscillate. This mechanical resonance, referred to herein as secondary resonance, is described in detail hereinafter. A graphical representation of the amplitude and phase response of the servo loop as a function of frequency is shown in FIG. 2A. The secondary resonance occurs at a frequency above the normal bandwidth of the servo loop and can cause loop oscillation at that frequency. The secondary resonance is damaging to the motor structure and consumes large amounts of servo power. Prior art solutions such as reduction of gain or increasing the strength of the motor structure to avoid resonance have not been satisfactory.

The effect of the secondary resonance in prior art systems on system response is illustrated with reference to FIGS. 2B-2D. A step position command input is shown in FIG. 2B. The position feedback signal from the position sensor 42 is shown in FIG. 2C. In this case, the response includes an undesirable oscillation 50 on the positive going portion as a result of the secondary resonance. In FIG. 2D, the loop gain of the servo system has been reduced to alleviate the effect of the secondary resonance. However, in this case the bandwidth is also reduced and the position feedback signal does not reach full amplitude, as indicated at 52. A desired response would follow the pulse shown in FIG. 2B as closely as possible.

The coil assembly 20 is shown in more detail in FIGS. 3A and 3B. The coil support 24 is a relatively thin-walled cylindrical member of lightweight material such as aluminum, titanium or beryllium having circumferential ribs 56 at opposite ends of the cylindrical surface for retaining the coil 28 in position. The conductors of the coil 28 are coated with epoxy for mechanical stability. Since the travel of the coil assembly 20 is typically limited to less than one inch, electrical connections to the coil 28 are made by arcuate leads of flexible material, such as speaker wire. The coil support 24 is connected to central bushing 22 by radial ribs 26.

It has been found that the secondary resonance described above is caused by a resonant flexing of the coil assembly 20. The flexing of the coil assembly 20 occurs in the form of axial deflection of the ribs 26, as indicated by the dashed lines in FIG. 3A, resulting from opposing forces exerted on opposite ends of the ribs 26. At the outer end of the ribs 26, a force is exerted on the coil 28 and the coil support 24 by the magnetic interaction inherent in the operation of the motor. An opposing force is exerted on the bushing 22 by the shaft 12 in the load 16. Therefore, the coil assembly 20 does not act as a rigid body, but flexes with a resonant frequency which adversely affects the operation of the servo loop.

In accordance with the present invention, the secondary resonance is suppressed by subdividing the cylindrical coil support 24 into separate coil support elements 24a, 24b, 24c, 24d as shown in FIG. 3B. The coil support 24 is divided by axial gaps 60 which completely separate the elements 24a, 24b, 24c and 24d. The axial gaps 60 can be made by saw-cutting through the finished coil support 24 or can be made by any other convenient technique. Each of the coil support elements 24a, 24b, 24c and 24d is connected to the bushing 22 by at least one of the ribs 26. The adjacent coil support elements are interconnected in a lossy and relatively flexible manner by the turns of the coil 28 and the epoxy coating over the coil 28. Since the coil support elements 24a, 24b, 24c and 24d are loosely and flexibly connected, independent flexing occurs with the overall result that secondary resonance of the assembly 20 is highly suppressed.

It will be understood that the coil assembly can have any number of radial ribs and that the coil support can be subdivided into any convenient number of separate elements. The gaps 60 are not necessarily axial, provided that the coil support is subdivided into a plurality of separate elements.

In one example of the present invention, the coil 28 consists of 1815 centimeters of 0.014×0.042 inch wire attached to the coil support 24 by an epoxy resin such as Epo-Teck 360T. At low frequencies up to 150 Hz, the coil assembly acts as a rigid mass. The total moving mass is 455 grams, of which the coil 28 is 65 grams, and the coil support 24 and the ribs 26 are 40 grams. The resonant behavior of the coil assembly is seen by considering the central shaft to be the reference, and the outer mass of the coil 28 and coil support 24 the resonant element, with the ribs 26 as beam-like springs. Since the coil support 24, absent the gaps 60, is a solid ring, the ribs 26 act as parallel springs with resonance depending on the in-phase action of each spring. After cutting of the gaps 60, the coil support comprises separate elements separated by the gaps 60, but coupled by the epoxy-held wires of the coil 28. The ribs 26, which were previously held in tight phase control by the solid coil support 24, now depend on the wires of the coil and the epoxy which holds the coil together to maintain phase. This connection is very lossy to high frequency mechanical resonance and causes a low mechanical Q or high internal damping, thereby greatly suppressing the resonance and permitting higher servo bandwidth.

A position command response of a servo loop incorporating the present invention is shown in FIGS. 4A and 4B. A pulse position command is provided to the loop as shown in FIG. 4A. The loop response is shown in FIG. 4B. The response reaches full amplitude in a short time due to the wider bandwidth and does not exhibit oscillatory behavior.

While there has been shown and described what is at present considered the preferred embodiments of the present invention, it will be obvious to those skilled in the art that various changes and modifications may be made therein without departing from the scope of the present invention as defined by the appended claims.

What is claimed is:

1. In a linear motor for driving a shaft connected to a load with linear motion along the shaft axis, said linear motor comprising a movable coil assembly including a cylindrical coil support coaxial with said shaft, a bushing having a smaller diameter than said coil support, said bushing being attached to said shaft, a plurality of radial ribs connecting said bushing to said coil support, and a coil comprising multiple turns of a conductor wound circumferentially around said cylindrical coil support, means for producing a radial magnetic field intersecting said coil, and means for supplying electrical current to said coil, the improvement comprising:
    said cylindrical coil support being subdivided into at least two separate coil support elements so that no part of said cylindrical coil support connects said at least two support elements, each of said at least two support elements being connected by at least one of said readial ribs to said bushing, whereby resonance of said coil assembly is suppressed.

2. An improved linear motor as defined in claim 1 wherein said coil support is subdivided by a plurality of axial gaps into generally arc-shaped coil support elements.

3. An assembly for a linear motor for driving a shaft, said assembly comprising:
    means for supporting a coil, said means for supporting including a plurality of portions of a cylindrical member, each portion of said plurality being for supporting said coil, each portion of said plurality being separated from the remaining portions of said plurality so that no part of said cylindrical member connects any two of said portions; and
    means for connecting said each portion of said plurality to said shaft, said means for connecting comprising a plurality of rib members, said rib members of said plurality corresponding to said portions on a one-to-one basis, each of said rib members having a first end thereof connected to its corresponding portions;
    so that mechanical resonance of said assembly in operation is suppressed.

4. An assembly as in claim 3 wherein each of said portions is defined by a first gap and a second gap, each of said first and said second gaps extending from one end of said cylindrical member to the other end of said cylindrical member.

5. An assembly as in claim 4 wherein each of said first and said second gaps is parallel to the axis of said cylindrical member so that each of said portions is generally arc shaped.

6. An assembly as in claim 3 further including a bushing for being attached to said shaft, each of said rib members having a second end connected to said bushing.

7. An assembly as in claim 3 further including means for loosely coupling together said portions of said plurality in order to damp resonance.

8. An assembly as in claim 7 wherein said means for loosely coupling includes a coil comprising multiple turns of a conductor, said coil being supported by said plurality of portions.

9. An assembly as in claim 8 wherein said means for loosely coupling further comprises an epoxy coating on said coil so that said plurality of portions are loosely coupled together by the turns of said coil and said epoxy coating.

10. A linear motor system comprising:
 a linear motor for driving a shaft connected to a load with linear motion along the axis of the shaft, said linear motor comprising
 a movable coil assembly including a plurality of portions of a cylindrical member coaxial with said shaft, each portion of said plurality being for supporting said coil, each portion of said plurality being separated from the remaining portion of said plurality so that no part of said cylindrical member connects any two of said portions, means for connecting said each portion of said plurality to said shaft, said means for connecting comprising a plurality of connecting members, said connecting members corresponding to said portions on a one-to-one basis, each of said connecting members having a first end connected to its corresponding portion, a coil comprising multiple turns of a conductor wound circumferentially around said plurality of portions;
 means for producing a radial magnetic field intersecting said coil;
 amplifier means for supplying an energizing current to said coil so as to produce linear movement of said coil assembly and said shaft;
 position sensing means for sensing the position of said shaft along said axis and producing a position feedback signal representative of said shaft position; and
 adding means for comparing said position feedback signal with a position command signal representing a desired shaft position and providing an error signal to said amplifier means for energizing said motor and reducing said error signal.

11. A linear motor system as defined in claim 10 wherein each portion of said plurality of portions is defined by a first gap and a second gap. Said first gap and said second gap each extending from one end of said cylindrical member to the other end of said cylindrical member.

12. A linear motor system as in claim 10 further including a bushing attached to said shaft, each of said connecting members having a second end connected to said bushing.

* * * * *